March 30, 1965 MASAO INABA ETAL 3,176,185

CATHODE RAY TUBE USED FOR POST DEFLECTION
COLOR TELEVISION SYSTEMS
Filed July 11, 1962

INVENTORS
MASAO INABA
KINYA KURIMOTO

BY

OSTROLENK, FABER, GERB & SOFFEN
ATTORNEYS

United States Patent Office 3,176,185
Patented Mar. 30, 1965

3,176,185
CATHODE RAY TUBE USED FOR POST DEFLECTION COLOR TELEVISION SYSTEMS

Masao Inaba and Kinya Kurimoto, Tokyo, Japan, assignors to Nippon Electric Company Limited, Tokyo, Japan Filed July 11, 1962, Ser. No. 209,177
Claims priority, application Japan, July 17, 1961, 36/25,603
3 Claims. (Cl. 315—21)

This invention relates to color television equipment, and more particularly to color television receiver facilities employing a novel receiver tube construction which is designed to control color selection by direct application of appropriate electrical signals in the region of the receiver tube screen assembly.

In color television, image reproducing tubes are typically constructed so as to superimpose the signal component of the luminosity which corresponds to the scene being televised and transmitted in the form of a sine-wave signal, the amplitude and phase of which are further modulated by the chromacity of the scene. The image reproducing tubes which are employed with such color transmission systems are the well-known tri-color image reproducing tubes having a shadow mask construction. Tubes of this type are more fully described in the reference text "Color Television—the NTSC System Principles and Practice," by P. S. Carnt and G. B. Townsend, copyright 1961, printed in England by the Chapel River Press, Limited.

In the color television image reproducing tubes, making use of the shadow mask construction and principles, mentioned above, the following fatal defects have been noted:

Since the utility of the electron current is small because of the shadow mask construction, the brilliance of the image surface is quite low in spite of the fact that high anode voltages for acceleration purposes are supplied.

Since the color selection is produced and determined by the angle of incidence which the electron beam makes with the shadow mask of the image reproducing tube, the true color which should be reproduced undergoes a change due to the influence of the external magnetic field; such as for example, the earth's magnetic field.

Since the resultant cross section of the electron beam which strikes the tube screen is rather large, there is a practical limit in the width of the beam to be resolved. It is further found necessary to perform the convergence function upon the three independent electron beams in order to converge these beams into one point on the image plane at any moment of scanning. This needed dynamic convergence is a highly complex function which must be performed by the receiver facility.

Since extremely high geometrical accuracy is required in the manufacturing of such shadow masks, the tubes become articles of comparatively high cost.

Above all, the great drawback from the practical point of view derives from the low brilliance, as well as the alteration from the true color which is caused by the influence of even very weak external magnetic fields, such as the earth's magnetic field, mentioned previously.

The device of the instant invention overcomes all of the aforementioned defects, while at the same time substantially simplifying both the image reproducing tube structure and complexity, as well as the electronic circuitry associated therewith.

The device of the instant invention is comprised of an image reproducing tube which is provided with a plurality of substantially parallel aligned elongated ribbons of fluorescent primary color elements where the primary colors are arranged in this ribbon fashion in substantially vertical alignment, and in a pre-determined array. A plurality of conductive ribbons or members are positioned in close proximity with the fluorescent elements and are controlled by alternating voltage sources in order to selectively deflect, or attract electrons from the sweeping electron beam provided in the image reproducing tube, thereby accurately determining the fluorescent elements upon which the electron beam will impinge. The instant invention is compatible with NTSC color system principles and provides electronic circuitry for receiving signals according to the aforementioned color system, and compensating for the control signals impressed upon the primary color electron beams in order to produce one composite electron beam therefrom having the requisite beam intensity.

Further circuitry is provided for producing under control of the video portion of the incoming signal, necessary voltage levels for control of the electron beam in the immediate region of the screen comprised of the primary color fluorescent elements.

It is therefore one object of this invention to provide a novel image reproducing tube for a color receiver facility, including means for determining which fluorescent elements will be struck by the impinging electron beam.

Another object of this invention is to provide a novel image reproducing tube having a screen assembly comprised of a plurality of elongated fluorescent elements representing the primary colors.

Still another object of this invention is to provide a novel image reproducing tube for color receiver facilities including a screen assembly having a plurality of deflector plates positioned in close proximity to the primary color fluorescent elements for controlling the impingement of electrons upon these fluorescent elements.

Another object of this invention is to provide a novel image reproducing tube for color receiving facilities having a three-phase alternating voltage arrangement designed to control the deflection of the electron beam in the immediate region of the fluorescent screen.

Another object of this invention is the provision of a method of modifying prior art black and white television image reproducing tubes to receive color television images and reproduce such images by applying a screen assembly according to the instant invention to the black and white television screen thereby producing a color receiving tube which is compatible with the color television system and black and white systems of the prior art.

These and other objects will become apparent when reading the accompanying description and drawings in which.

Figure 1:
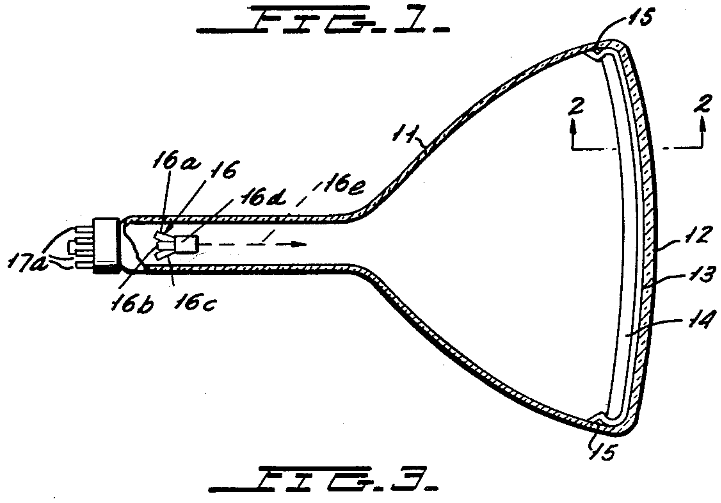
FIGURE 1 is a sectional view of an image reproducing tube constructed according to the principles of the instant invention.

Referring now to the drawings:

FIGURE 1 illustrates an image reproducing tube 10, employed for color television reception and made according to the present invention and which is comprised of an envelope 11, formed of a transparent insulating material such as glass, or the like, and a face plate 12, adapted for receipt of the screen assembly of the instant invention. The screen assembly 13, comprises a plurality of fluorescent color strips, as will be more fully described, which color strips include the primary colors, red, blue and green, an which strips are arranged so as to be perpendicular or obliquely positioned relatively to the horizontal scanning direction of the tube 10. In this particular example, the strips 13 are arranged in a vertical fashion parallel to the plane of FIGURE 1. Positioned immediately adjacent the fluorescent strips 13 are deflecting plates or members 14, which are further positioned so as to be substantially perpendicular to the tube screen or face 12, and which are maintained in this position by positioning or holding means 15, provided at the top and bottom edges of the tube 10, for maintaining the deflecting plates 14 in their proper position. The image reproducing tube 10, is further provided with an electron gun 16, shown therein in schematic form only, which electron gun structure 16 is provided with three independent electron sources 16*a* through 16*c* which sources emit electron beams of an intensity corresponding to the intensity of the three primary color signals received by the receiver facility in a manner to be more fully described. The focusing electrode 16*d* is provided for consolidating the three electron beams into a unitary electron beam, represented by the dashed line 16*e*. The neck of tube 10 is provided with a base 17, having a plurality of connecting pins 17*a* positioned for engagement with a suitable socket (not shown) which pins are connected in any suitable manner to the electron beams 16*a* through 16*c* and other electrodes provided within the tube envelope 11.

The electron beams 16*e* emitted from the electron gun 16*a* through 16*c* are accelerated by suitable accelerating voltage levels so as to travel in the direction of the tube face 12. Suitable deflecting means such as those shown in FIGURE 3 and which will be more fully described, cause the electron beam 16*e* to undergo deflection in both horizontal and vertical directions as the electron beam proceeds towards the tube face 12. The beam 16*e* impinges upon the tube surface and the kinetic energy of the electrons provide suitable energy to excite the fluorescent elements 13, causing them to become luminescent. Although this operation as has been described so far is in conformity with prior art reproducing tubes, the essential difference of the instant invention lies in the fact that the deflecting plates 14, which are arranged in close proximity to the screen 12, act upon the electron beams in such a manner as to deflect the electrons in the immediate region of the fluorescent elements 13, causing them to strike specified ones of the fluorescent elements 13, thereby controlling the colors reproduced by the fluorescent elements.

Figure 2:
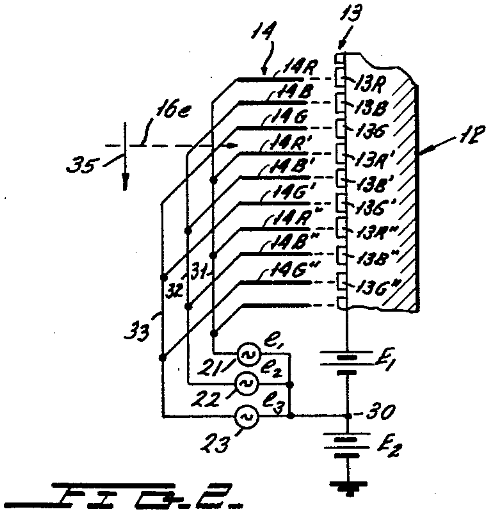
FIGURE 2 is a view of a portion of the image reproducing tube shown in FIGURE 1 taken along line 2—2', and further showing the electrical connections to said tube portion.

Elaborating on this description, reference is made to FIGURE 2, which shows a section 22' of FIGURE 1 aligned substantially in the horizontal direction. From this view it should be further understood that the fluorescent strips or elements 13 are arranged so as to be substantially parallel to one another and are further shown in a regular order such as the order shown in FIGURE 2, for example, consisting of red, blue and green strips in succession, which strips are designated in FIGURE 2 as 13R, 13B, 13G; 13R', 13B', etc. wherein the letters R, B, and G represent the colors red, blue and green respectively. Each elongated fluorescent strip 13, has an associated deflecting plate 14 arranged relative to the fluorescent strips so as to be positioned along a line (see the dashed lines) which is perpendicular to the faces of the fluorescent strips 13 and which is substantially equally distant from the edges of the associated fluorescent strip. The fluorescent strips 13 and the associated deflecting plates 14, as arranged in FIGURE 2 are electrically connected as shown in FIGURE 2 such that the constant voltage sources $E_1$ and $E_2$ are connected with the positive terminal of voltage source $E_2$ at a terminal 30. The positive terminal of voltage source $E_1$ is electrically connected to the right hand sides of the fluorescent strips 13 in order to maintain a constant voltage level across the entire face of the tube at all times. This may be done by providing a relatively thin conductive coating across the interior or left hand face of the tube envelope 12. The negative terminal of voltage source $E_2$ is connected to reference or ground potential. These voltage sources are provided for the purpose of accelerating electrons in the direction of the tube face 12. In addition to these constant voltage sources, alternating voltage sources $e_1$, $e_2$ and $e_3$ are provided and are connected to the deflecting plates 14 in a predetermined fashion. The first terminals of voltage sources 21 through 23 are connected in common to terminal 30. The second terminals of voltage sources 21 through 23 are connected to busses 31 through 33 respectively. Bus 31 is electrically connected to the deflecting plates 14R, 14R', 14R'', etc. The bus 32 is connected to deflecting plates 14B, 14B', 14B'', etc. as is the bus 33 connected to the deflecting plates 14G, 14G', and 14G'', in much the same manner. It should be noted that only a portion of the tube screen construction has been shown in FIGURE 2 for purposes of clarity. The voltage sources 21 through 23 connected to the red, blue and green fluorescent strip deflecting plates respectively are designed so that they all operate at the same signal frequency but have different phase relationships relative to one another; such as, for example, the phase arrangements in well known three phase alternating voltage systems.

For the purpose of further describing the operation of the arrangement shown in FIGURE 2 let it be assumed that the electron beam 16*e* is in the position as shown in FIGURE 2. Let it also be assumed that the busses 31 through 33 are at instantaneous voltage levels which are higher than any of the following values:

$$E_2-\hat{e}_1$$
$$E_2-\hat{e}_2$$
$$E_2-\hat{e}_3$$

(where $\hat{e}_1$, $\hat{e}_2$ and $\hat{e}_3$ denote the maximum value of each of them). Assuming that alternating voltage $e_1$ is positive while alternating voltages $e_2$ and $e_3$ are negative at this instant of time, then the electron beam 16*e* which is sweeping in the direction of the arrow 35 for example, as well as in the direction shown by the electron beam arrow, will be directly affected by these instantaneous voltage values which are impressed upon the reflecting plates 14G and 14R' in the immediate region of the electron beam 16*e*. All the electrons directed to the space between the plates 14R' and 14G are deflected toward the plate 14R' which is at a higher potential than the deflecting plates 14G, 14B', and thus pass through the right hand end of the deflecting plate 14R' which is provided with a plurality of apertures, or may be formed of a screen material represented schematically by the dashed lines of FIGURE 2 thereby causing the electron beam 16*e* to strike the surface of fluorescent element 13R' thereby resulting in luminescence of only the red fluorescent material 13R'. If, for example, the electron beam 16*a* moved between the deflecting plates 14B and 14G, which are substantially at negative potentials the electron beam is deflected away from the deflecting plates 14B and 14G and hence the fluorescent elements 13B and 13G, thereby preventing impingement of any electrons upon any fluorescent elements other than the red fluorescent element 13R'.

For the sake of simplicity, in the foregoing description only voltage $e_1$ was taken positive while voltages $e_2$ and $e_3$ were assumed to be negative at this instance. However, it should be noted that if voltages $e_1$, $e_2$ and $e_3$ are at the proper potential for the moving electron beam 16*e* it is evident that the luminescence of any single color of red, blue or green, or any color combination thereof can be brought into being.

Figure 3:
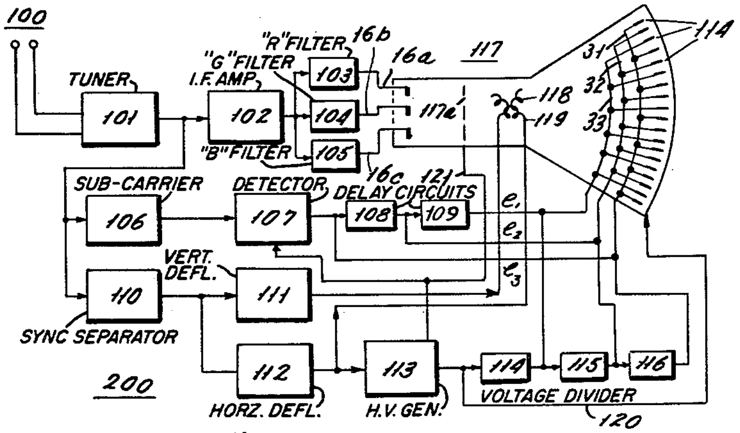
FIGURE 3 is a schematic drawing illustrating a color receiver facility employing the image reproducing tube and associated peripheral circuitry according to the principles of the invention described herein.

An example of the color receiving facility employing the image reproducing tube of FIGURES 1 and 2, and which is designed according to the instant invention, is shown in the schematic diagram of FIGURE 3. The color receiver facility 200 is comprised of suitable input terminals 100 for connection to an antenna (not shown), which supplies the television carrier waves to the receiving set 200. The modulated carrier signal is then impressed upon a receiving circuit 101 which has the capability of performing high frequency amplification—a first frequency conversion function, an IF amplification stage function, a second detection function and which ultimately generates the composite video signal of the television system (i.e., with the carrier frequency completely removed). This composite video signal is impressed upon the input terminals of a circuit 102 which functions as an amplifier in order to amplify the composite video signal up to a suitable level and to impress the amplified signal upon the input terminals of electronic filter circuits 103 through 105.

Connected to the electron gun 16$a$ through 16$c$ and operative in a manner to be more fully described, the electron guns are included in the image producing tube 117 designed according to the principles of the instant invention. A sub-carrier regulator circuit 106 is provided, which is arranged to maintain a pre-determined phase relationship between the incoming video signals and a local source (not shown) which may be an oscillator for example, arranged to operate at approximately 3.6 mc. The circuitry 106 provides at its output terminal the demodulated chrominance or color signal which was employed to modulate the sub-carrier of the color video signal which sub-carrier is removed by the local frequency means operating at the 3.6 mc. frequency. Circuit 110 is provided for sync separation and is connected to the output of circuit 101 for separating synchronizing pulses from the composite video signal and impressing the synchronizing pulses upon the vertical deflecting and horizontal deflecting circuits 111 and 112 respectively, which constitute the sweep circuit for controlling the sweep of the electron beam. Circuits 111 and 112 are connected respectively to the deflecting yokes 118 and 119 provided in image reproducing tube assembly 117 which receive adequate deflecting currents from circuits 111 and 112 to control the movement of the electron beam.

A high voltage generating circuit 113 is provided for providing the necessary accelerating voltages in the image reproducing tube which voltages are represented by the letters $E_1$ and $E_2$ in FIGURE 2. Additional accelerating voltages are also employed in order to accelerate the electron beam toward the deflecting plates 14. This is provided for by connecting the output terminal of high voltage generating circuit 113 to the tube surface by lead 120 and to the accelerating grid 117$a$ of tube 117 by means of conductor 121. A plurality of voltage divider means 114 through 116 are provided to produce pre-determined D.C. potential levels upon the busses 31 through 33 respectively, connected to the appropriate deflecting plates 14R, 14B and 14G respectively. These voltage divider circuits are connected in tandem to the ouput of high voltage generating circuit 113 in the manner shown in FIGURE 3.

In color television image reproducing tubes, arranged and electrically connected in the manner recited immediately above, it is understood that the electron beams emitted from the three electron guns are of the form of a super-position of three separate intensity modulations, which are controlled in accordance with the luminance signal of the composite video signal and together with the chrominance signal which is synchronously detected by the regulating circuit 107, and are applied to the appropriate deflecting plates 31 through 33 in a manner to be more fully described, thereby controlling the excitation of selected ones of the fluorescent elements.

When employing video signals according to the well known NTSC system to the receiver facility of the instant invention, it should be noted that the ratio of the luminance signal component to the color difference signal component, according to the NTSC matrix is different for each of the red, blue and green color signals. Thus, in order to correct for the above differences the filter circuits 103 through 105 are so designed as to compensate for the loss of the frequency range which lies approximately between 2.5 and 4.2 mc., by inserting signals to compensate for this loss which is caused by the chrominance subcarrier wave which has a frequency of approximately 3.6 mc. and by its side band component. Thus the absolute loss of the filters 103 through 105 is taken into consideration in order to correct for the luminance efficiency of the fluorescent substances of red, blue and green respectively, exclusively of the results of the deflecting plate structure 14.

In accordance with the phases of the color difference signals of the NTSC system, the deflecting voltages $e_1$ through $e_3$ are selected in the following manner. That is to say, if the chrominance singal $e_c$ is taken as:

$$e_c=\frac{E_R-E_Y}{1.14}\cos wt\ \frac{E_B-E_Y}{2.03}\sin wt \qquad (1)$$

where $$E_Y=0.30E_R+0.59E_G+0.11E_B \qquad (2)$$

$E_R$, $E_G$ and $E_B$ are signal voltages of red, green and blue respectively.

Then in order to detect the presence of the red signal by means of the voltage $e_1$, it follows immediately from Equation 1 that $$e_1=\hat{e}_1\cos wt=e_1\sin(wt+90^\circ) \qquad (3)$$

Similarly, the expression for the blue voltage signal is derived from Equation 1 as follows:

$$e_2=\hat{e}_2\sin wt \qquad (4)$$

Further the expression for green can be obtained from (2) as follows:

$$E_G-E_y=0.51(E_R-E_Y)-0.19(E_B-E_Y) \qquad (5)$$

Thus, from (1) and (5), it follows that:

$$e_3=\hat{e}_3\sin(wt+236^\circ) \qquad (6)$$

The maximum values $\hat{e}_1$, $\hat{e}_2$ and $\hat{e}_3$ of the alternating voltages $e_1$, $e_2$, and $e_3$ are the respective values determined by the acceleration voltage after the electron beam has passed the deflecting plates 14, and the velocity of the electron beam before it reaches the deflecting plate. These maximum voltage values should be substantially equal to one another.

The circuits 108 and 109 are arranged so as to provide the necessary phase delays in order to maintain the phase relationships expressed in Equations 3, 4 and 6 presented above. As can be understood from the above description, the color television image reproducing tube made by applying a cathode ray tube designed according to the present invention has the following advantages:

(1) Since there is a barrier such as the so-called prior art shadow mask arrangement which screens the electron beam, high utility of the electron beam may be achieved and an image surface having high brilliance can be obtained.

(2) Since the color selection is conducted by means of the local deflection in the vicinity of the screen, it is very stable as it is not affected by external magnetic fields, such as the earth's magnetic field.

(3) Since no geometrical accuracy is required in the manufacture of the cathode ray tube, it can be made at a comparatively low cost.

(4) Although three electron beams are used, the feature of the cathode ray tube enables three beams to be converged in a very simple manner.

Figure 4:
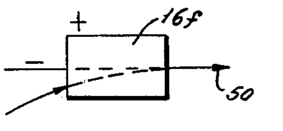
FIGURE 4 is a sketch illustrating the electrode employed for focusing the electron beams of the color receiver tube into a single consolidated electron beam for the purposes described in the instant invention.

Amongst the above advantages, the easy focusing of three beams mentioned in (4) is made clear by FIGURE 4. That is to say, FIGURE 4 illustrates the converging action of the coaxial cylinder 16$f$; if, in the diagram, the internal electrode would be taken as the negative potential and the external electrode as the positive potential and further if the electron beam would be accelerated in the direction shown by the arrow 50, with proper velocity, then the electron beam would come out along the axis of the cylinder 16$f$ under the deflection caused by the electric field set up in the cylinder. In consequence, if three electron guns are arranged along a cylindrical surface resulted from rotation around the arrow 50 as its axis, electron beams which have passed the converging electrode would exactly come into coincidence with the axis of the tube 16$e$, therefore, it is understandable that no correction is required for the dynamic convergence if the electron beams shall be allowed to be subject to the magnetic field of main deflection after having passed the convergence electrode as is the case in shadow mask tubes.

In addition, it is comparatively easy to modify the conventional black and white television image reproducing tube by the use of a cathode ray tube made according to the present invention. That is to say, in FIGURE 3 those elements which are not contained in the black and white television image reproducing tube are only an alternating voltage generating part in use for local deflection starting from the chrominance sub-carrier regenerator 106 and filters 103–104 through which are supplied video signals to the cathode ray tube; it is easily conceivable that it is quite sufficient to construct the former into a form of small chassis and the filters may be attached to the socket of the cathode ray tube by making use of a simple circuit.

The above is an explanation of the performance and the advantages of the color television cathode ray tube made according to the present invention, specifically for the sake of convenience of explanation, the case of image reproducing of the color television of the so-called NTSC system was also explained. It is needless to say that the cathode ray tube of this kind has excellent performance not only in the image reproducing tube of the simultaneous color television system, but also in the image reproducing tube of the sequential color television system and also that in that of the stereoscopic television.

Although there has been described a preferred embodiment of this novel invention, many variations and modifications will now be apparent to those skilled in the art. Therefore, this invention is to be limited, not by the specific disclosures herein, but only by the appending claims.

The embodiments of the invention in which an exclusive privilege or property is claimed are defined as follows:

1. Image reproducing means for generating a true-color image comprising a tube envelope; first and second groups of fluorescent elements for emitting colored light when suitably excited; said first group being formed of elongated ribbon-like elements all being of a first primary color; said elements being substantially parallel to each other and being arranged in a plane adjacent the tube face; said second group being formed of elongated ribbon-like elements all being of a primary color different from said first primary color; said second group elements being substantially parallel to and interspersed with said first group elements in a regular predetermined array; an electron gun positioned in the neck of said tube for generating an electron beam; means for causing said electron beam to trace a predetermined pattern on said tube face; a first electronic control means; a second electronic control means; said first and second control means being adapted to generate first and second alternating voltages respectively; a first array of deflecting members arranged in spaced parallel fashion, each member being positioned adjacent and perpendicular to said first group elements and connected to said first control means; a second array of deflecting members positioned adjacent and perpendicular to said second group elements and connected to said second control means; said first and second deflecting member arrays being adapted to control the path of said electron being in the immediate vicinity of said tube face to determine the fluorescent elements to be bombarded by said electron beam; said first and second control means being adapted to generate first and second alternating voltages each being of the same signal frequency; said first control means generating an alternating current signal $e_1$; said second control means generating an alternating current signal $e_2$ where $e_1$ has a phase delay of approximately 90° relative to $e_2$; said third control means generating an alternating current signal $e_3$ where $e_3$ has a phase delay relative to $e_1$ of approximately 236°.

2. Image reproducing means for generating a true-color image comprising a tube envelope; first and second groups of fluorescent elements for emitting colored light when suitably excited; said first group being formed of elongated ribbon-like elements all being of a first primary color; said elements being substantially parallel to each other and being arranged in a plane adjacent the tube face; said second group being formed of elongated ribbon-like elements all being of a primary color different from said first primary color; said second group elements being substantially parallel to and interspersed with said first group elements in a regular predetermined array; an electron gun positioned in the neck of said tube for generating an electron beam; means for causing said electron beam to trace a predetermined pattern on said tube face; a first electronic control means; a second electronic control means; said first and second control means being adapted to generate first and second alternating voltages respectively; a first array of deflecting members positioned adjacent and perpendicular to said first group elements and connected to said first control means; a second array of deflecting members arranged in spaced parallel fashion, each member being positioned adjacent and perpendicular to said second group elements and connected to said second control means; said first and second deflecting member arrays being adapted to control the path of said electron being in the immediate vicinity of said tube face to determine the fluorescent elements to be bombarded by said electron beam; said first and second control means being adapted to generate first and second alternating voltages each being of the same signal frequency and being separated by a predetermined constant phase angle; said first control means generating an alternating current signal $e_1$; said second control means generating an alternating current signal $e_2$ where $e_1$ has a phase delay of approximately 90° relative to $e_2$; said third control means generating an alternating current signal $e_3$ where $e_3$ has a phase delay relative to $e_1$ of approximately 236°.

3. Image reproducing means for generating a true-color image comprising a tube envelope; first, second and third groups of fluorescent elements for emitting colored light when suitably excited; said first group being formed of elongated ribbon-like elements all being of a first primary color; said elements being substantially parallel to each other and being arranged in a plane adjacent the tube face; said second group being formed of elongated ribbon-like elements all being of a primary color different from said first primary color; said second group elements being substantially parallel to and interspersed with said first group elements in a regular predetermined array; said third group being formed of elongated ribbon-like elements all being of a primary color different from said first and second primary colors; said third group elements being substantially parallel to and interspersed with said first group elements in a regular predetermined array; an electron gun positioned in the neck of said tube for generating an electron beam; means for causing said electron beam to trace a predetermined pattern on said tube face; first, second and third electronic control means for generating first, second and third alternating voltages respectively; a first array of deflecting members arranged in spaced parallel fashion, each member being positioned adjacent and perpendicular to said first group elements and connected to said first control means; a second array of deflecting members arranged in spaced parallel fashion.

each member being positioned adjacent and perpendicular to said second group elements and connected to said second control means; a third array of deflecting members arranged in spaced parallel fashion, each member being positioned adjacent and perpendicular to said third group elements and connected to said third control means; said first, second and third deflecting member arrays being adapted to control the path of said electron being in the immediate vicinity of said tube face to determine the fluorescent elements to be bombarded by said electron beam; said first control means generating an alternating current signal $e_1$; said second control means generating an alternating current signal $e_2$ where $e_1$ has a phase delay of approximately 90° relative to $e_2$; said third control means generating an alternating current signal $e_3$ where $e_3$ has a phase delay relative to $e_1$ of approximately 236°, said signals $e_1$, $e_2$ and $e_3$ all being substantially the same frequency.

References Cited by the Examiner

UNITED STATES PATENTS 2,879,325 6/59 Miller ---------------- 178—5.4

DAVID G. REDINBAUGH, *Primary Examiner.*

ROBERT SEGAL, *Examiner.*